United States Patent Office 3,470,250
Patented Sept. 30, 1969

3,470,250
PRODUCTION OF SECONDARY ALKYL PRIMARY AMINES
John A. Patterson, Fishkill, Lawrence W. Menapace, Beacon, and William P. Doyle, Lagrangeville, N.Y., assignors to Texaco Inc., New York, N.Y., a corporation of Delaware
No Drawing. Filed June 30, 1967, Ser. No. 650,220
Int. Cl. C07c *85/10, 85/00*
U.S. Cl. 260—583                                    11 Claims

ABSTRACT OF THE DISCLOSURE

A process for producing secondary alkyl primary amines and, in particular, secondary alkyl primary amines having from 10 to 25 carbon atoms wherein a $C_{10}$ to $C_{25}$ paraffin hydrocarbon is reacted in the liquid phase with a vaporous nitrating agent to produce a crude nitrated product containing paraffin, nitroparaffins, ketones, alcohols and acids, reacting the crude nitrated product in the presence of a hydrogenation catalyst first with hydrogen and thereafter with a mixture of hydrogen and ammonia, thereby producing secondary alkyl primary amines from the nitroparaffins, ketones and alcohols.

---

This invention relates to the production of amines and, more particularly, to the production of secondary alkyl primary amines having from 10 to 25 carbon atoms from paraffin hydrocarbons.

An object of this invention is to provide an efficient process for mono-aminating paraffin hydrocarbons having from 10 to 25 carbon atoms.

Another object of this invention is to provide a process, wherein nitroparaffins, ketones and alcohols are converted to primary amines.

Yet another object of this invention is to provide a process for producing such amines in high yield and purity.

These and other objects of this invention will become more apparent from reading the following detailed description of the invention.

The objects of this invention are broadly accomplished by initially contacting a paraffin hydrocarbon in the liquid phase with a nitrating material such as nitric acid or nitrogen dioxide in the vaporous state. The product of the reaction, hereafter referred to as the crude nitrated product, comprises nitroparaffins, ketones and alcohols along with minor amounts of carboxylic acids and polyfunctionals such as dinitroparaffins, nitroketones, nitroalcohols, glycols and diketones in addition to unreacted paraffin hydrocarbon. The crude nitrated product is thereafter stepwise reacted first with hydrogen and thereafter with a mixture of hydrogen and ammonia, in each instance in the presence of a hydrogenation catalyst thereby initially converting the nitroparaffins and thereafter the ketones and alcohols to secondary alkyl primary amines. In a preferred embodiment, carboxylic acids contained in the crude nitrated product are neutralized and removed prior to the initiation of the hydrogenation reaction. The amines prepared in accordance with this process are thereafter isolated and recovered by suitable and conventional means. It is to be understood that the process generally described above and detailed below is applicable in both batch and continuous operations.

PARAFFIN HYDROCARBONS

The paraffin hydrocarbons contemplated in this invention are straight chain aliphatic hydrocarbons containing from 10 to 25 carbon atoms. Such hydrocarbons include n-decane, n-dodecane, n-tetradecane, n-pentadecane, n-octadecane, n-eicosane, n-pentacosane and mixtures thereof. Typical paraffin hydrocarbon mixtures applicable to this invention include hydrocarbons containing from 10 to 25 carbon atoms which are obtained from middle distillatees as by absorption in molecular sieves or from such other sources as urea or solvent dewaxing.

NITRATION

The nitration of paraffin hydrocarbons to secondary mono-nitroparaffins is conducted in the liquid-vapor phase. By secondary mono-nitroparaffin we mean that the nitro group is predominantly located on other than the paraffin's terminal carbon atom. The reaction of the liquid paraffin-hydrocarbon with a vaporous nitrating agent is conducted at temperatures ranging from about 250 to 500° F. and preferably between 300 to 400° F. at atmospheric pressure but higher pressures up to 20 atmospheres may be employed. Reaction temperatures in excess of 500° F. should be avoided in that paraffin conversion to mono-nitroparaffin may be reduced and undesirable side reactions occur including the formation of polynitro compounds. Such side reactions cause undue contamination of the crude reaction product and require additional costly purification procedures to be employed. At temperatures below 250° F., reaction times become excessively long and unattractive.

Among the nitrating agents contemplated in this process we mention nitrogen dioxide, nitric acid and dinitrogen trioxide.

In either batch or continuous operations the vaporous nitrating agent is best introduced into the reaction zone by bubbling and dissolving the agent in the liquid hydrocarbon, preferably aided by agitation, so as to create a large interfacial area between the vapor and liquid.

The rate of nitrating agent introduction can be varied within wide limits. It has been found that the rate of nitrating agent addition may control the rate of the reaction. Within the temperature limitations specified above, the rate of nitrating agent addition may vary from 0.05 to 0.55 mole per mole of paraffin per hour. In a highly preferred and efficient operation, the rate of nitrating agent addition corresponds closely to the rate at which the vaporous nitrating agent dissolves and reacts in the paraffin since under these conditions little or no nitrating agent remains unconverted. This preferred rate has been found to be about 0.1 to 0.2 mole of nitrating agent per mole of paraffin per hour. Any excess nitrating agent is recovered along with nitric oxide, a reaction by-product, the latter in continuous operations subsequently oxidized to nitrogen dioxide, and both nitrogen dioxide streams recycled for reintroduction into the nitration reaction zone.

Sufficient nitrating agent is provided so as to convert about 5 to 50% and preferably between about 20 to 40% paraffin hydrocarbon to the corresponding mono-nitroparaffin, ketone and alcohol. Conversions in excess of 50% are to be avoided because of formation of undesirable by-products and conversions below 5% are undesirable because of inefficient and expensive operations.

In addition to secondary mono-nitroparaffins, ketones and secondary alcohols, each to be later converted to the corresponding secondary alkyl primary amine, other oxygenates are present in the crude nitrated product, particularly carboxylic acids. It is believed that the presence of substantial amounts of such acids in the subsequent hydrogenation stages, cause curtailment of catalyst life and activity in addition to undue corrosion of processing equipment. It has been found that catalyst life and activity can be extended by caustic washing the crude nitration product prior to hydrogenation. Caustic washing and removal of such acid by-products may be accomplished as by treating as by treating the crude with aqueous solutions of sodium bicarbonate, sodium carbonate, potassium hydroxide, sodium hydroxide, ammonium hydroxide or lime, and preferably by washing 3 parts of crude with 1 part of 10% aqueous sodium hydroxide.

HYDROGENATION

The crude nitrated product, preferably after washing, is reacted wtih hydrogen under pressure in the presence of a hydrogenation catalyst to convert the nitroparaffin to the corresponding primary amine.

Catalysts capable of hydrogenating the nitroparaffin to its corresponding amine include nickel, cobalt, platinum, palladium, modified nickel such as zirconium nickel, Raney nickel, Raney cobalt, copper chromite and rhodium. Preferred catalysts are nickel and rhodium. The catalyst may be either in its free form or supported or impregnated on or in an inert base such as kieselguhr, silica, alumina, pumice, asbestos, silica gel and carbon. The quantity of catalyst employed in a batchwise reaction may vary from about 0.1 to 30%, preferably between 1 and 15%, based on the weight of crude nitrated product. In continuous operations of from 0.1 to 20 volumes of liquid per volume of catalyst per hour and preferably 0.3 to 5 v./v./hr. are employed.

Hydrogenation may be conducted in the presence of a polar or non-polar solvent. Preferably the solvent is inert to the reactants and catalysts, is liquid under reaction conditions and is capable of solubilizing the nitroparaffin. Applicable polar solvents include alcohols such as methanol, ethanol, butanol, isopropanol, etc. As non-polar solvent we may employ paraffin hydrocarbons such as hexane, isoctane, decane, tetradecane, eicosane, pentacosane and cycloaliphatics such as cyclohexane and methyl cyclohexane. We prefer, however, to employ non-polar solvents and particularly and the unreacted hydrocarbon from nitration. In the instance where polar solvents such as low molecular weight alcohols are employed, such solvents must be substantially removed, as by, for example, distillation, prior to amine isolation.

Upon conversion of at least 50% of the nitroparaffin to the corresponding amine, this hydrogenated crude nitrated product is contacted with a mixture of hydrogen and ammonia in a ratio ranging from 1 to 10 moles of hydrogen to one mole of ammonia wherein nitroparaffin hydrogenation is continued and reductive amination of ketones and amination of secondary alcohols is initiated. The multi-stage hydrogenation set forth herein represents a critical feature of this invention. It has been found that introduction of ammonia during the first stage of nitroparaffin hydrogenation decreases catalyst activity. When, however, introduction of ammonia is delayed until a substantial portion, that is, at least 50%, of the nitroparaffin has been converted to its corresponding primary amine, the presence of ammonia thereafter functions not only as a ketone and alcohol amination agent but surprisingly as a process stabilizer in that ammonia inhibits primary amine conversion to secondary amines.

The first stage hydrogenation wherein the nitroparaffin is converted to the amine may be conveniently performed at temperatures ranging from 100° F. to 400° F. and preferably from 200 to 350° F. at pressures ranging from 50 to 3000 p.s.i.g., preferably between 200 and 600 p.s.i.g. The second stage, initiated by the introduction of hydrogen and ammonia to convert the alcohols and ketones to their respective amines, is conducted at a higher temperature ranging from 250° F. to 400° F. The amount of hydrogen introduced into each hydrogenation stage may vary from about 2 to 50 moles of hydrogen per mole of nitroparaffin and preferably between about 3 and 10 moles of hydrogen per mole of nitroparaffin. The temperature range provided above for amination and reductive amination of the alcohols and ketones respectively is such that secondary alkyl primary amines, in the absence of stabilizing ammonia, will itself interact to form substantial amounts of secondary amine not easily separated from the desired primary amine products.

AMINE ISOLATION AND RECOVERY

Conventional amine recovery procedures may be employed as by distilling the crude reaction product by stepwise fractionation. Preferably, where higher purity amines are desired, isolation of secondary alkyl primary amines from the hydrogenated crude is performed by treatment with inorganic acids, such as hydrochloric, phosphoric or sulfuric, in an aqueous medium, recovering the amine salt as an aqueous solution and washing the aqueous solution with a liquid hydrocarbon, such as pentane, or in place thereof steam distilling the hydrocarbon from the amine salt mixture. Thereafter the amine salt is heated with a base, such as sodium or potassium hydroxide, and the isolated amine is recovered. Purification of the amine to purities of 99% and higher may be accomplished by vacuum distilling the recovered amine.

Where non-polar solvents, such as liquid alkanes or paraffins are present during hydrogenation, such solvents need not be removed from the reduced crude product prior to the acid treatment mentioned above. Separation of the paraffins from the amines is accomplished by means of the acid and liquid hydrocarbon wash or by steam distillation. Separation by fractionation and recycle of paraffin to the nitration step and liquid hydrocarbon to the washing step may be included in continuous operations. In this connection we refer to copending application Ser. No. 650,242 filed on June 30, 1967, in the names of Siegart et al. and assigned to Texaco Inc. which is hereby incorporated by reference. Where polar solvents have been introduced into the hydrogenation reaction, such solvents must be substantially removed from the crude prior to the preferred acid treatment in that their presence inhibits amine salt separation.

Secondary alkyl primary amines obtained according to this process represent amines wherein the amino group is randomly positioned along the carbon chain on other than the terminal carbon atom. The carbon chain may vary from 10 to 25 carbon atoms according to the starting paraffin hydrocarbon. The present amines are unlike the primary alkyl primary amines, the so-called fatty acid amines, which have the amino group on a terminal carbon atom.

The amines produced according to this process may be employed as mold release agents, emulsion freeze-thaw stabilizers, pigment dispersing agents, polyurethane catalysts and anti-caking-anti-dusting agents. Their use is also indicated as corrosion inhibitors, deleterious bacteria control agents, sludge dispersants and as detergents and deicers in gasoline. The following examples are illustrative of the invention but the scope of the invention is not to be limited thereby.

EXAMPLE I

Nitration

One hundred and seventy pounds of a normal paraffin mixture consisting of by weight 9.1 percent n-decane, 32.6 percent n-undecane, 29.4 percent n-dodecane, 22.5 percent n-tridecane and 6.4 percent tetradecane is charged into a 50 gallon reactor and heated to 300° F. Nitrogen dioxide, at about 300° F., is charged into the reactor with stirring through a sparger at the rate of 5 pounds per hour for 5 hours. Off-gases from the reactor are passed through a condenser where vaporized hydrocarbon, water and normally liquid reaction products are knocked back to a separator, then through a caustic scrubber to remove acidic gases and vented to the atmosphere. The water insoluble portion of the condensed liquid is returned to the reactor. The aqueous portion is drawn off and discarded.

After 5 hours, charging of nitrogen dioxide is discontinued and the reaction mixture cooled. Sixty-three pounds of 10 percent of the weight sodium hydroxide solution is charged to the reactor and this mixture stirred for 10 minutes and the spent caustic solution containing salts of fatty acids separated. The hydrocarbon solution is washed with 63 pounds of water and dried by filtering through clay. The resulting crude nitrated product consists of 133 pounds of n-paraffin, 48 pounds of nitroparaffin and 9 pounds of alcohols and ketones.

Hydrogenation

The above crude nitrated product is passed, in an atmosphere of hydrogen, through a four inch diameter tubular reactor containing 15 pounds of a 0.5 percent rhodium or alumina catalyst. A reaction temperature of 212° F. is maintained under a hydrogen pressure of 500 p.s.i.g. and at a space velocity of 0.7 v./v./hr. The effluent from this reaction zone composed of paraffins, amines, ketones, alcohols and unreacted nitroparaffins is charged to a second reaction zone containing 15 pounds of a zirconium promoted nickel on kieselguhr catalyst under a 500 p.s.i.g. atmosphere of hydrogen and ammonia in the ratio of 3 to 1. The reaction proceeds at a temperature of 300° F. and the effluent is passed through the reaction zone at a space velocity of 0.7 v./v./hr. The effluent from the second reaction zone consists of 132 pounds of hydrocarbon, 38 pounds of mono-amines, 2 pounds of alcohols and ketones and 8 pounds of polyfunctionals. The yield represents 75.5 percent conversion of nitroparaffin and oxygenates to mono-amines.

Isolation and recovery

The amines are separated from the reactor effluent by initially treating the effluent with 63 pounds of 5 molar sulfuric acid, and diluting with an equal volume of water. The resulting aqueous and hydrocarbon layers are separated and the aqueous layer washed twice with equal volumes of pentane. The amines are liberated from the aqueous solution by treatment with 46 pounds of 30 percent sodium hydroxide solution and the amine layer recovered is distilled yielding a product having a purity of 99 percent.

EXAMPLE II

A hydrogenation feedstock was prepared consisting by weight of 20 percent nitrodecane, 77 percent n-decane and 3 percent oxidation products of approximately 4.5/1 $C_{10}$-ketone/$C_{10}$-alcohol. One hundred parts by weight of feedstock and 10 parts of a nickel on kieselguhr catalyst were charged to a rocking stainless steel autoclave, hydrogen introduced and reacted for 9 hours at 212° F. under 500 p.s.i.g. hydrogen pressure. The recovered product consisted of 11.2 parts amine representing a 56.6 percent conversion of nitroparaffin and oxygenates to monoamines or a 66.7 percent conversion of nitroparaffin to amine.

EXAMPLE III

Example II was repeated with the addition of 10 parts of ammonia introduced into the reactor. In this instance, the recovered product consisted of 4.8 parts of amine which represented a 24.2 percent conversion of nitroparaffin and oxygenates to mono-amines.

We claim:
1. A process for producing secondary alkyl primary amines comprising:
(a) contacting a paraffin hydrocarbon having 10 to 25 carbon atoms per molecule with a vaporous nitrating agent at temperatures ranging from about 250 to 500° F. to produce a crude mixture containing paraffin, secondary mono-nitroparaffin, ketone and alcohol, said mixture of paraffin, nitroparaffin, ketone and alcohol having from 10 to 25 carbon atoms per molecule,
(b) reacting said crude product of (a) with hydrogen at a temperature ranging from about 100 to 400° F. in the presence of a hydrogenation catalyst and reducing to secondary alkyl primary amines at least 50% of said nitroparaffin contained in said crude,
(c) reacting said ketone, alcohol and nitroparaffin contained in the crude product of (b) with hydrogen and ammonia at a temperature ranging from about 250 to 400° F. in the presence of a hydrogenation catalyst and converting said ketone, alcohol and nitroparaffin to secondary alkyl primary amines, and
(d) isolating and recovering said secondary alkyl primary amines from the crude product of (c).
2. The process of claim 1 wherein the crude product of (a) is caustic washed prior to step (b).
3. The process of claim 1 wherein from 5 to 50% of said paraffin hydrocarbon of step (a) is converted to mono-nitroparaffin, ketone and alcohol.
4. The process of claim 1 wherein the ratio of hydrogen and ammonia in step (c) ranges from 1 to 10 moles of hydrogen per mole of ammonia.
5. The process of claim 1 wherein said paraffin hydrocarbon has from 10 to 15 carbon atoms.
6. The process of claim 1 wherein said hydrogenation catalyst is nickel.
7. The process of claim 1 wherein said hydrogenation catalyst is rhodium.
8. A process for producing secondary alkyl primary amines from a mixture containing secondary mono-nitroparaffin, ketone and alcohol having from 10 to 25 carbon atoms which comprises:
(a) reacting said mixture with hydrogen at a temperature ranging from about 100 to 400° F. in the presence of a hydrogenation catalyst and reducing to secondary alkyl primary amines at least 50 percent of said nitroparaffin contained in said mixture;
(b) reacting said ketone, alcohol and nitroparaffin contained in said partially reduced product of (a) with hydrogen and ammonia at a temperature ranging from about 250 to 400° F. in the presence of a hydrogenation catalyst and converting said ketone, alcohol and nitroparaffin to secondary alkyl primary amines; and
(c) isolating and recovering said secondary alkyl primary amines from the product of (b).
9. The process of claim 8 wherein the ratio of hydrogen and ammonia in step (b) ranges from 1 to 10 moles of hydrogen per mole of ammonia.
10. The process of claim 8 wherein said hydrogenation catalyst is nickel.
11. The process of claim 8 wherein said hydrogenation catalyst is rhodium.

References Cited

UNITED STATES PATENTS

| 2,174,498 | 9/1939 | Johnson | 260—583 |
| 3,336,386 | 8/1967 | Dovell et al. | 260—583 X |
| 3,366,686 | 1/1968 | Rosenthal et al. | 260—583 |

FOREIGN PATENTS

| 713,109 | 7/1965 | Canada. |

CHARLES B. PARKER, Primary Examiner

R. L. RAYMOND, Assistant Examiner

U.S. Cl. X.R.

260—689